3,265,767
POLYMERIC PIGMENT CONTAINING AMIDE NITROGEN, AND HAVING AN ACRYLONITRILE CORE
John R. Caldwell and Edward H. Hill, Kingsport, Tenn., assignors to Eastman Kodak Company, Rochester, N.Y., a corporation of New Jersey
No Drawing. Filed July 25, 1962, Ser. No. 212,474
1 Claim. (Cl. 260—883)

This invention relates to improved pigments of cross-linked polymers for use in plastics such as synthetic resins, cellulose esters and the like so as to enhance dyeability of fibers and shaped objects such as film and to enhance water vapor transmission through thin layers, and for other uses. This invention also relates to certain fibers containing these improved pigments and to the dope compositions from which such fibers can be spun. The pigments provided are essentially composed of dense discrete particles having diameters less than 10 microns and are comprised of a cross-linked high polymer including a substantial proportion of a monoethylenically unsaturated aliphatic amide and from about 0.1 percent to about 15 percent by weight of an organic cross-linking compound containing at least two nonconjugated ethylenically unsaturated bonds in at least a sufficient amount to form a cross-linked high polymer which is insoluble in water and insoluble in organic solvents normally used in processing organic plastic materials, the proportions of constituents being such that the pigment contains at least about 8 percent nitrogen in the amide form.

This application is a continuation-in-part of our parent application Serial No. 623,534, filed November 21, 1956, now abandoned. From one standpoint this application is a division of the parent application with respect to the polymeric pigments described therein and originally claimed therein. However, this application also includes supplementary disclosures with respect to the pigments and their utilization. This application is also a continuation-in-part of our copending application, Serial No. 836,921, filed August 31, 1959, now abandoned, as a continuation-in-part of said Serial No. 623,534. The present application is also related to application Serial No. 623,533, filed on the same date as the parent application by Caldwell, Gilkey and Dannelly now U.S. Patent 2,893,970, granted July 7, 1959. The parent application 623,534 and the concurrently filed application 623,533 as well as said Serial No. 836,921 describe inventions involved in employing the polymeric pigments being described and claimed as such in the present application. The present application also describes and claims dopes and synthetic fibers which can be solution spun from said dopes containing the pigments of this invention. The present application is being filed so as to more distinctly claim the invention with respect to the art cited against the earlier applications.

Subsequent to the filing of the above-mentioned earlier applications certain art has been published which has endeavored to define some polymeric pigments as "microgel particles" which are said to be a swollen form of microsol particles which have a "gel point" concentration in any given extending medium at which point the medium is absorbed by the particles and a sharp increase in viscosity is observed at and above this point. However, such art does not contemplate those polymeric pigments of this invention having at least 8 percent amide nitrogen which results in certain quite unexpected and unobvious properties. Thus the present invention provides many advantages not generally attributed to polymeric pigments merely because they may or may not have certain gel points. The polymeric pigments of the present invention frequently have gel points above 33 percent, but they can still be employed in the form of relatively nongelatinous hard dense particles when they happen to have lower gel points, i.e., it is of no consequence as to whether the pigment particles of this invention are in a "swollen" form when in a dope being spun to form fibers of some synthetic material.

The claims of the present application cover cross-linked polymers which are useful in an unobviously different way, viz, a spinning dope which contains pigment particles which are not generally considered to be swollen microgel particles in the detailed sense described in publications such as U.S. 2,908,659 and Ind. Eng. Chem., 41, 511–520 (1949). Instead, the particles are relatively insoluble, dense, discrete particles in the spinning dope. Thus the mere characteristic of particles having gel points of from 2 percent up to about 50 percent is not necessarily relevant as to whether the particles are swellable and have d-microgel properties since even at a gel point of about 30 percent many polymeric pigment particles are substantially nonswellable in a normally accepted sense. Examples of well known pigments used in synthetic fibers include carbon black having a gel point of 6 percent, titanium dioxide having a gel point of 35 percent and indigo having a gel point of 25 percent. Other pigments which might be described as microgels are set forth in U.S. Patent 2,772,050 and in Am. Dye Reporter, 42, 341–42. Also see Physical and Chemical Examination of Paints, Varnishes, Lacquers and Colors, by H. A. Gardner, 1946 edition, pages 289–298, as to the characteristics of pigments regarding thickening and gelling effects. None of the polymeric pigments of the present invention are given any preliminary swelling treatment prior to introduction into a dope for spinning fibers and there is no occasion for considering them to be swollen when in such a dope.

Pigments having a gel point above about 25 percent have been described wherein the compositions must contain 50 percent cross-linking agent to attain this gel point. It is well known that highly cross-linked structures of this type have a greatly reduced permeability toward dyes and moisture in comparison with structures containing substantially less cross-linking agent. In the other previously described pigments having from 3 to 12 percent cross-linking agent the gel points are down in the range of 1.2 to 10.6 percent. It is thus apparent that such pigments must be very highly cross-linked in order to obtain a gel point of at least 30 percent. Such pigments normally would have a reduced tendency to absorb dyes and moisture because of their rigid, three-dimensional structure.

By way of example in contrast to such products the coated particles having the compositions of Examples 12 and 13 in the present application contain only 1.5 percent cross-linking agent, based on the weight of the N-methylmethacrylamide, yet the gel point is 39 percent. Since such compositions contain such a small amount of cross-linking agent, they readily absorb dyes and moisture. It is thus apparent that the pigments of this invention possess a unique combination of properties: They frequently have a high so-called gel point (33 percent or higher) and at the same time are readily penetrated by dyes and moisture because they are not highly cross-linked, i.e., they contain no more than about 15 percent cross-linking agent.

Moreover, certain valuable properties of the pigments of this invention are unexpectedly dependent upon the amide content. That is, pigments containing more than about 8 percent amide nitrogen have a greatly improved utility over those that contain lesser amounts or no amide nitrogen at all. Pigments having this content of amide nitrogen show a substantially higher moisture absorption and better dyeing properties than other types of pigments. In order to obtain especially preferred results, a minimum of about 8 percent amide nitrogen is required. If less than this amount is present, such a large amount of pigment is required that the fiber properties are adversely affected when such pigments are incorporated therein.

The pigments of this invention can be used to make improved articles of manufacture comprising shaped organic plastics incorporating such pigments. Such shapes include sheets, coatings, and other supported or unsupported films, threads, yarns, and other articles of manufacture made from fibers such as unwoven fabrics, rods, tubes, molded objects including extrusions as well as various complicated shapes, etc. Such shapes in thinner form have an unusual quality in that when properly constructed they allow the transmission of water vapor but resist the transmission of liquid water.

The thinner articles which can be fabricated from pigmented organic plastics using the pigments of this invention can be readily dyed after they have been shaped. If desirable, dyeing can be accomplished prior to the shaping so that thicker articles have a uniform color throughout. If uniformity throughout the structure is not required for the coloration, the dyeing can be accomplished after the shaping operation has been performed.

According to one aspect, this invention relates to an improvement in the process of solution spinning readily dyeable synthetic organic fibers wherein the composition to be spun contains such a polymeric pigment. The synthetic fibers with which this invention is particularly concerned include those derived from cellulose acetate, acrylonitrile polymers and copolymers, and other highly polymeric addition polymers (vinyl-type) which are capable of being formed into fibers by solution spinning procedures.

The prior art describes the employment of polymers derived from a monoethylenically unsaturated aliphatic amide compound which can be added to solutions of cellulose acetate and other fiber-forming materials to impart special dyeing properties. However, these polymeric additives which have been described are soluble in the dopes used for spinning the fibers. When a fiber has been spun containing such an additive, the additive tends to separate out from the principal fiber-forming material and form its own phase since it is generally incompatible with the fiber-forming material.

It is also known that mixtures of two polymeric materials can usually be separated by the use of selective solvents. For example, in the case of a fiber spun from a dope of poly-acrylonitrile and poly-N-isopropyl acrylamide, the poly-N-isopropyl acrylamide is soluble in water and tends to be leached out of the fiber in the dye bath. Thus, some of the polymerized monoethylenically unsaturated aliphatic amide compound which was present in the fiber is entirely lost, while some remains on the surface and forms a sticky layer that causes "plastering" of the filaments.

According to this aspect of the present invention, the improved polymeric pigments are employed for the preparation of dopes of fiber-forming materials by incorporating this pigment into the dope of the fiber-forming constituent which is to be spun so as to form a synthetic organic fiber. These polymeric pigments of this invention are characterized by certain properties: (1) They are discrete particles having diameters less than 10 microns and preferably less than 2 microns, (2) they are not soluble in the dopes or solutions in which they are used, and (3) they contain at least about 8 percent nitrogen in the amide form on the surface of each pigment particle.

These polymeric pigments do not separate as a distinct phase from the fiber-forming constituent of the fiber into which they have been incorporated since they are physically distributed in a uniform manner throughout the structure of the fiber and hence cannot flow together and separate out as a liquid or gel phase. Because of their insolubility in water and the common organic solvents, they obviously retain their discrete form within the structure of the fiber. Thus the polymeric pigments of this invention avoid the difficulty called "plastering" which is characteristic of forming fibers from ordinary mixtures of two polymeric materials. The polymeric pigments of the present invention avoid this difficulty because they retain their particulate structure at all times and hence cannot diffuse through the fiber and migrate to the surface.

It is an object of this invention to provide synthetic organic fibers which are characterized by excellent dyeability with cellulose acetate dyes, acid wool dyes, direct cotton dyes, vat dyes, basic dyes and other coloring agents.

It is a further object of this invention to provide synthetic organic fibers which contain a dye receptive pigment which is mechanically distributed in a uniform manner throughout the fiber and is not subject to phase separation or "plastering" difficulties when two or more filaments come into mutual contact.

It is a further object of this invention to provide such synthetic organic fibers which possess the valuable characteristics of the principal fiber-forming constituents while at the same time having improved dyeability, freedom from phase separation, "plastering" and other related difficulties associated with the production of fibers containing constituents designed to enhance their dyeability.

It is another object of this invention to provide polymeric pigments (and processes for their preparation) comprising particles of less than 10 microns in size prepared from a cross-linked polymer comprising polymerized monoethylenically unsaturated aliphatic amide compound, which polymeric pigment is insoluble both in water and in common organic solvents and contains at least about 8 percent amide nitrogen.

It is an additional object of this invention to provide a composition for the solution spinning of synthetic organic fibers, which composition is commonly referred to as a dope and contains uniformly distributed therethrough a polymeric pigment of the type described above.

An additional object of this invention is to provide a process for pigmenting synthetic organic fibers to enhance their dyeability but without deleteriously affecting their desirable physical and chemical properties by solution spinning a dope containing a polymeric pigment of the type described herein.

Another object of this invention is to provide dopes for employment in the solution spinning of synthetic organic fibers which contain a polymeric pigment having the characteristics described.

Other objects will become apparent elsewhere herein.

In accordance with a principal embodiment of this invention there is provided a pigment adapted for incorporation in synthetic organic plastics essentially composed of dense discrete particles containing at least about 8 percent amide nitrogen and having diameters less than 10 microns, said pigment being comprised of a cross-linked high polymer of (1) at least 30 percent by weight of a monoethylenically unsaturated aliphatic amide selected from the group consisting of maleic amides, fumaric amides, itaconic amides, citraconic amides, and acrylamides wherein the nitrogen atoms of all of these amides and the α-position of the acrylamides are joined to two members selected from the group consisting of (a) lower alkyl and hydroxyalkyl radicals containing from 1 to 6 carbon atoms and (b) a hydrogen atom, and (2) from about 0.1 percent to about 15 percent by weight of an organic cross-linking compound containing at least two nonconjugated ethylenically unsaturated bonds in at least a sufficient amount to form a cross-linked high polymer which is insoluble in water and insoluble in organic solvents normally used in processing said plastics.

Advantageously the polymeric pigments of this invention incorporate the defined minimum of 30 percent by weight of the amide monomeric component since this, among other things, contributes the principal dye receptive characteristic to the polymeric pigment. However, this figure is not especially precise as long as the total amount of nitrogen in the amide form is at least 8 percent. The amounts of such nitrogen present in the composition of the pigments in the various working examples given hereinbelow is tabulated below. The range of from about 8 to about 25 percent amide nitrogen is essential for pigments which possess high moisture absorption, excellent dyeing properties and other superior qualities.

| Example No. | Percent of Aliphatic Amide Monomer | Percent of Comonomer | Percent of Crosslinking Compound | Percent Nitrogen in Polymer from —CO—NH$_2$ |
|---|---|---|---|---|
| 1 | 99.01 | 0 | 0.99 | 11.7 |
| 2, 3 | 90 | 8 | 2 | 12.3 |
| 4 | 78.25 | 15.5 | 6.25 | 12.3 |
| 5 | 82.0 | 16.36 | 1.64 | 19.7 |
| 6 | 39.2 | 58.84 | 1.96 | 9.83 |
| 7, 8 | 99.01 | 0 | 0.99 | 11.65 |
| 9 | 96.16 | 0 | 3.84 | 12.91 |
| 10 | 58.8 | 39.24 | 1.96 | 8.6 |
| 11 | 78.25 | 15.5 | 6.25 | 13.7 |
| 12 | 27.4 [1] (98.5) | 72.26 [1] (0) | 0.34 [1] (1.5) | 14.2 |
| 13 | 27.4 [1] (98.5) | 72.26 [1] (0) | 0.34 [1] (1.5) | 14.2 |
| 14 | 68.2 | 22.7 | 9.1 | 10.61 |
| 15 | 62.5 | 28.4 | 9.1 | 9.75 |
| 16 | 70.0 | 20.0 | 10.0 | 10.9 |
| 17 | 70.0 | 20.0 | 10.0 | 10.9 |
| 18 | 70.0 | 20.0 | 10.0 | 10.9 |

[1] Parenthetical figures are based upon the surface coating composition on the pigment particles.

As can be seen from the above table, the range of percentages of aliphatic amide monomer is 39.2 percent to 99.01 percent for uniform particles and as low as 27.4 percent for coated particles. It is obvious that it is the coating which provides the effective surface. As a round figure for the lower limit 30 percent is considered appropriate. The upper limit is based upon the fact that the cross-linking compound has been indicated to be used in an amount of at least about 0.1 percent. The overall amounts of amide nitrogen can be as high as 25 percent or higher, although higher amounts are generally uneconomical. Lower amounts such as 5.5 percent amide nitrogen are associated with definitely inferior properties as illustrated hereinafter.

In accordance with another principal embodiment of this invention there is provided a dope composition adapted for use in preparing readily dyeable synthetic organic fibers by the solution process, which dope comprises an organic solvent and a fiber-forming constituent soluble in the solvent and from about 1 percent to about 40 percent (based on the weight of the fiber-forming constituent) of a polymeric pigment having a particle size of less than 10 microns comprising a high polymer derived from a monoethylenically unsaturated aliphatic amide compound, the pigment being insoluble both in water and in said organic solvent and being substantially uniformly distributed throughout the dope.

The fiber-forming constituents with which this invention is particularly concerned includes any of the well-known polymeric materials employed in the preparation of synthetic organic fibers by solution spinning methods although the polyamide fibers, the polyester fibers, etc., can also be employed using a solution spinning process and a known solvent. Thus this invention applies to those fibers which are now well-known in the art and which can be employed in the preparation of yarns, threads, woven fabrics, unwoven fabrics, various textile materials, ropes, etc., and which are characterized by melting points of at least 150° C. and generally 200° C. or higher as well as numerous other chemical and physical characteristics well known to those acquainted with the art of manufacturing synthetic organic fibers and products produced therefrom. Examples of such polymeric materials which are well known to be useful in the preparation of synthetic organic fibers include cellulose acetate, cellulose acetate propionate, cellulose acetate butyrate, ethyl cellulose, other cellulosic materials, acrylonitrile polymers and interpolymers such as acrylonitrile modified with vinyl acetate, acrylonitrile modified with vinyl chloride, acrylonitrile modified with vinylidene chloride, etc. Although the polyesters such as poly(ethylene terephthalate), the polyamides, etc., are not ordinarily spun by solution spinning methods, such polymers can be prepared in this manner and include polymerized tetramethylene glycol condensed with p,p'-sulfonyl-dibenzoic acid and succinic acid, polymerized trans-1,4-cyclohexane-dimethanol condensed with terephthalic acid and glutaric acid, any of the numerous nylon type polyamides such as hexamethylene diamine condensed with adipic acid or succinic acid, etc. Solvents for polyesters and the like are available for solution spinning, e.g., trifluoracetic acid as is explained in U.S. Patent 2,710,848. Of course, this invention is particularly concerned with the preparation of synthetic organic fibers from those fiber-forming materials which are ordinarily formed into fibers by the solution spinning process. Ordinarily the polyesters, polyamides, and polyester-amides are formed by melt-spinning instead of solution spinning although solution spinning techniques can also be employed.

Most advantageously the present invention is particularly concerned with the cellulose ester fibers and the acrylic fibers derived from acrylonitrile polymers and interpolymers since these fibers are generally prepared by the solution spinning processes. Of course, as already mentioned, numerous other materials can also be used in the preparation of synthetic organic fibers and are also contemplated within the broad scope of this invention including polymeric materials derived from acrylates, methacrylates, styrene, ethylene, etc.

Many patents have been issued which describe the preparation of synthetic organic fibers from cellulose esters and acrylic polymers by the solution spinning technique and these patents present a wealth of information as to the nature of these fiber-forming materials, how they can be prepared, their physical and chemical characteristics, the details of how dopes are prepared containing these fiber-forming materials, numerous additives which can be incorporated into such dopes, the conditions under which such dopes can be spun to form fibers, the apparatus and method of operating the apparatus used in forming such fibers, the twisting of yarns, making of threads, weaving of textiles, the preparation of unwoven fabrics, manufacture of ropes, etc. It is obvious that there is nothing to be gained by reviewing or discussing all of the ramifications so thoroughly explained and considered in the previously issued patents and publications readily available in the literature and with which those skilled in the art are quite familiar.

To those acquainted with the art of solution spinning of fiber-forming materials it will be apparent that the essence of this invention resides in several features, the most significant of which is the provision of a polymeric pigment which can be incorporated into the dope and which has the physical and chemical characteristics described herein and which contributes certain valuable physical and chemical characteristics to the fiber produced as described herein.

As already pointed out, the improved polymeric pigments of this invention include an addition type polymer derived from a monoethylenically unsaturated aliphatic amide compound. This particular class of polymers contributes the principal dye receptive characteristic to the polymeric pigment. In some instances there are reasons which make it advantageous to prepare polymeric pigments from high polymers which contain up to 70 percent or more of other polymerized unsaturated compounds, provided that the surface coating of the pigment contains at least about 8 percent amide nitrogen. These other compounds can be any of those which are capable of forming a copolymer with the monoethylenically unsaturated aliphatic amide and which contribute some desirable physical or chemical characteristic.

In some instances, the high polymers of a monoethylenically unsaturated aliphatic amide compound may not be completely insoluble both in water and in the organic solvent employed in forming the dope in the solution spinning of fibers. In these instances in particular and in all other instances, it is essential that a third constituent be present in the polymeric pigment which serves as a cross-linking agent resulting in the formation of a polymeric pigment which is insoluble both in water and in said organic solvent. Since this insoluble characteristic is an essential feature of the polymeric pigments of this invention, this invention requires the presence of from about 0.1 percent up to about 10 percent to 15 percent of a cross-linking agent in the composition of the polymeric pigment. Most advantageously, there is employed from about 0.5 to about 10 percent of a cross-linking agent. However, more than 15 percent reduces certain advantageous qualities of the pigments as mentioned elsewhere herein.

In addition to the monoethylenically unsaturated aliphatic amide monomer, it does not appear to be of much consequence as to what other monomeric compounds are employed, if any, in the praparation of the polymeric pigments so long as such other compounds are copolymerizable with the monomeric amide compound in the proportion selected. These copolymerizable compounds can be any of those which are capable of forming a copolymer and are preferably those which contribute some desirable physical or chemical characteristic to the copolymer or which result in a copolymer of substantially equal properties as would be obtained without their use and with a consequent saving in cost. Thus the cost of the copolymer may be substantially less by an appropriate selection of the comonomer without substantially reducing the quality of the polymeric pigment. Such comonomers include those in the working examples given hereinbelow and include styrene, vinyl chloride, vinyl acetate, vinylidene chloride, vinylidene cyanide, acrylic acid, its homologs and functional derivatives thereof including esters such as methyl acrylate, methyl methacrylate, butyl acrylate, etc., as well as other functional derivatives such as nitriles, etc. These comonomers can be defined as monoethylenically unsaturated organic compounds containing from 2 to 25 or more carbon atoms and which are copolymerizable with said amide monomers.

The nature of the cross-linking agents for polymers and copolymers of monoethylenically unsaturated aliphatic amide compounds is well known in the art pertaining to additive type vinyl polymers of this general class and needs no elaboration herein. Suitable examples of such cross-linking agents include methylenebisacrylamide, allyl methacrylate, diallyl maleate, triallyl cyanurate, divinyl benzene, diallyl terephthalate, allyl acrylate, naphthalene-bis-acrylamide, ethylene glycol diacrylate, diethylene glycol dimethacrylate, etc. Many other such compounds can also be employed which contain two (or more) non-conjugated ethylenically unsaturated bonds. Generally speaking, such compounds would advantageously contain from about 5 to 25 or more carbon atoms when in monomeric form.

Although a preferred embodiment of this invention has already been described specifically naming a group of aliphatic amide compounds, it is obvious that this invention is intended to encompass any equivalent compounds. Examples of such compounds include acrylamide, α-methacrylamide, N-methyl-α-methacrylamide, N-isopropylacrylamide, N,N-dimethylacrylamide, N-(2-hydroxyethyl)-acrylamide, N-butyl-α-methacrylamide, N,N,N',N'-tetramethylmaleamide, fumaric amide, N,N'-diethylitaconic diamide, the corresponding amides and also the ester-amides of maleic, fumaric, itaconic and citraconic acids, and numerous other equivalent amides, ester amides and N-substituted derivatives thereof such as will be apparent to those skilled in the art. The alkyl radicals for the alcoholic portion of the ester-amides of the dibasic acid amides can be advantageously derived from those alkyl radicals containing from 1 to 6 carbon atoms. Advantageously the amide compounds encompassed by this invention contain a total of from 3 to 30 carbon atoms.

The methods for polymerizing such amide compounds so as to prepare polymers or copolymers thereof with other monoethylenically unsaturated compounds as well as the methods for cross-linking such polymers and copolymers are well illustrated in the prior art with which this invention is not directly concerned but which is further illustrated in several of the working examples presented hereinbelow. Thus in the preferred embodiment of this invention the polymerization of such polymers, copolymers or cross-linked polymers or copolymers is carried out in accordance with a solution-polymerization technique such as that technique involving the employment of a redox catalyst system. The known solution polymerization procedures can by carefully controlled modifications be adapted to produce a polymeric pigment which is finely divided and which can be separated from the medium of polymerization as finely divided particles having diameters of no more than 10 microns depending upon the modification of the process, and with appropriate modifications such diameters can be obtained which are considerably less than 2 microns. In some instances, the pigment polymer can be ground in a comminuting mill of conventional design in order to produce a sufficiently small particle size. It is advantageous to perform such grinding in the presence of the organic solvent which will be used in the preparation of the dope into which the pigment is to be introduced. By employing this solvent as the liquid medium in which the grinding is performed, the pigment can be ground to diameters as little as 1 micron or less, which particles will be uniformly distributed throughout the solvent and will consequently become more quickly and advantageously distributed throughout the dope in a uniform manner.

When the polymeric pigment polymer or copolymer is formed in an aqueous medium, it is advantageous to carry out the polymerization in the presence of a surface-active agent or a protective colloid in order to obtain the desired particle size employing techniques well known in the art. The aqueous suspension of the polymeric pigment material can then be dried and ground in a suitable mill or it can be dried by spraying the suspension of polymer into a heated chamber with an atomizer nozzle (under circumstances which permit the suspending medium to be evaporated) and separating the dried powder of the polymeric material for use as the polymeric pigment. Generally such spray-drying techniques can be readily developed so as to produce a polymeric pigment of the desired size although further grinding can be performed if required.

The working examples given below specifically illustrate how such spray-drying techniques can be performed. It is obvious that not all spray-drying equipment will produce satisfactory results.

When the polymer for the polymeric pigment is made in water, catalysts which can be advantageously employed include potassium persulfate, ammonium persulfate, hydrogen peroxide, sodium perborate and numerous other peroxy catalysts. The employment of a redox catalyst system can be advantageously employed under these circumstances. It is also advantageous to employ surface-active agents or protective colloids in order to control the particle size and facilitate the preparation of polymeric material of suitable particle size for use as the polymeric pigment.

When the polymer for use as the polymeric pigment is made in an organic solvent, suitable catalysts include benzoyl peroxide, acetyl peroxide, cumene hydroperoxide, azo-bis-isobutyronitrile, etc., as well as numerous other peroxy-type catalysts.

One of the uses of the polymeric pigments of this invention, as already mentioned above, is described in parent application Serial No. 623,534 and involves the incorporation into a fiber-forming dope so that fibers spun from the dope contain the pigment. Another related patent application is Caldwell, Dannelly and Hill Serial No. 701,715, now U.S. Patent 2,976,182, granted August 5, 1960, which describes the use of such pigments in films including coating materials to be impregnated or coated onto supports such as other films, fabrics and the like, e.g., waterproof fabrics which transmit water vapor. In some instances it is advantageous to prepare the pigments in an organic solvent and leave the pigments in the solvent until such time as they are to be incorporated in a film or fiber-forming dope. Thus the pigment may be suspended in a suitable solvent such as would normally be used in preparing the film or fiber-forming dope and when the time comes to prepare the dope the formula for the dope can be adjusted so as to allow for the presence of the solvent associated with the composition containing the pigment.

When the pigment is prepared in organic solvents, protective colloids which can be advantageously employed to control the particle size include polymeric materials that are soluble in the organic solvent and especially those polymeric materials that are also fiber-forming and which are contemplated for employment as all of or as a part of the material to be used in the preparation of a synthetic organic fiber which is to be pigmented. Such materials serve as protective colloids during the polymerization of the monoethylenically unsaturated aliphatic amide. The resulting dispersion in the organic solvent can then be advantageously added to a cellulose acetate spinning dope or other analogous spinning dope, which is then spun in the usual manner.

The pigments of this invention may be in the form of a dry free-flowing material consisting essentially of the dense discrete particles without any additives. The pigments of this invention in such form are substantially colorless or of a relatively neutral whitish, cream or tan color depending upon the materials used in preparing the polymeric pigments. The term "pigment" does not in itself contemplate that it has any particular color. However, this invention encompasses dyed pigment particles which are the dense discrete particles already described and which contain organic dyes such as those dyes well known in the art to be useful in dyeing polymers containing amide linkages such as polyamide fibers and various acrylonitrile fibers modified with monoethylenically unsaturated aliphatic amides, etc. This invention also encompasses liquids in which such dyed pigments are incorporated. Such liquids generally are uniform suspensions of the polymeric pigments of this invention in either an organic solvent which would normally be used in a subsequent operation or in an aqueous medium such as would be used in preparing or processing the organic plastic material which is to be ultimately shaped into an article of manufacture such as sheets, fibers, tubes, films, etc.

The general principles which are involved in practicing this invention as well as the details involved are believed apparent from the above discussion when considered in the light of the examples which are presented hereinbelow. In addition, reference is made to the various patents in the prior art which describe the employment of pigments in printing inks, lacquers, enamels, paints, alkyd resins, drying oils, molding plastics, rubber, sheets, wrapping materials, etc. Art of this type gives numerous illustrations of the dyestuffs which can be employed in forming colored pigments and illustrates that such pigments can either be dyed before they are introduced into the material being pigmented or they can be dyed afterward. Exemplary nonanticipatory art which may be of some value in illustrating various aspects of some matters pertaining to the present invention includes U.S. 2,265,127, U.S. 2,265,559, U.S. 2,534,136, U.S. 2,614,089, British 781,185, Australian 152,319, etc.

Other art of possible comparative significance includes U.S. 2,821,521, U.S. 2,839,479, and U.S. 2,840,447. Such art does not suggest polymeric pigments of the improved and unique characteristics described herein.

This invention can be further illustrated by the following examples of preferred embodiments although it will be understood that these examples are included merely for purposes of illustration and are not intended to limit the scope of the invention unless otherwise indicated.

*Example 1.—Pigment for polyacrylonitrile fibers*

The following materials were placed in a flask:

| | Grams |
|---|---|
| N-tert-butylacrylamide | 50.0 |
| N-isopropylacrylamide | 50.0 |
| Divinylbenzene | 1.0 |
| Sodium dodecyl sulfate | 3.0 |
| Potassium persulfate | 1.0 |
| Water | 900.0 |

The mixture was stirred vigorously at 80 to 90° C. for 6 hours. A stable emulsion was produced. The emulsion was spray-dried by spraying it into a heated chamber with an atomizer nozzle. The fine powder was collected and ball milled with dimethylformamide until a smooth, stable suspension was obtained. The pigment dispersion was mixed with a solution of polyacrylonitrile in dimethylformamide to give 20 percent pigment, based on the weight of the polyacrylonitrile. Fibers spun from the dope dyed well with acid wool, direct cotton, and cellulose acetate dyes.

*Example 2.—Pigment for cellulose acetate fibers*

Ninety grams of N-isopropylacrylamide, 8 grams of 2-methyl-5-vinylpyridine, and 2 grams of divinylbenzene were dissolved in 400 grams of acetonitrile, and 1.0 gram of azo-bis-isobutyronitrile was added as catalyst. The mixture was stirred at 70 to 75° C. for 10 hours. There was no apparent change except for a slight haze, but analysis showed that the reaction had gone to about 85 percent completion and a suspension of the cross-linked polymer in acetonitrile was formed. The suspension was filtered through paper and showed no substantial change in composition. The particles of cross-linked resin were small enough to pass through the paper. Part of the suspension was added to an acetone dope of cellulose acetate to give 15 percent pigment, based on the acetate. Fibers spun from the mixture dyed well with acid wool and direct cotton dyes.

*Example 3.—Pigment for polyacrylonitrile fibers*

Part of the suspension prepared as described in Example 2 was added to a dimethylacetamide dope of polyacrylonitrile. Fibers spun from the mixture dyed well with acid wool and direct cotton dyes.

*Example 4.—Pigment for cellulose acetate fibers*

Twenty-five grams N-isopropylacrylamide, 5 grams 2-methyl-5-vinylpyridine, 2 grams divinylbenzene, 3 cc. acetic acid, 0.4 gram azo-bis-isobutyronitrile, and 65 cc. of tert-butyl alcohol were stirred and heated at 50° C. for 24 hours. The cross-linked resin separated out as a fine powder. The powder was washed with acetone and then ball milled with acetone to give a fine suspension. The suspension of pigment in acetone was added to a cellulose acetate spinning dope in acetone. Yarn containing 10 to 15 percent of the pigment dyed well with acid wool and direct cotton dyes.

*Example 5.—Pigment for polyacrylonitrile fibers*

Ten grams of polyacrylonitrile was dissolved in 200 grams of dimethylformamide and the following materials were added:

| | Grams |
|---|---|
| Acrylamide | 50.0 |
| Methylene-bis-acrylamide | 1.0 |
| Benzoyl peroxide | 1.0 |

The solution was stirred at 70 to 80° C. for 15 hours. A fine suspension of cross-linked polyacrylamide was formed. The suspension was added to a spinning dope of polyacrylonitrile in dimethylformamide. Fibers made from the dope and containing 15 to 20 percent of the pigment dyed well with cellulose acetate dyes, acid wool dyes, and vat dyes. The fibers did not become sticky or plastered in the dye bath.

*Example 6.—Pigment for cellulose acetate or polystyrene fibers*

The following materials were placed in a flask:

| | Grams |
|---|---|
| Vinyl acetate | 60.0 |
| Fumaric amide | 40.0 |
| Diallyl phthalate | 2.0 |
| Sodium octadecyl sulfate | 4.0 |
| Potassium persulfate | 1.0 |
| Water | 1000.0 |

The mixture was stirred at 60° C. for 20 hours to give a stable emulsion. The emulsion was sprayed into a heated air chamber through a fine nozzle and the pigment was collected as a powder. The powdered pigment was ground with acetone in a ball mill and the suspension was mixed with acetone spinning dopes of cellulose acetate or polystyrene. Fibers containing 10 to 20 percent of the pigment dyed well with acid wool dyes, direct cotton dyes, and vat dyes. Other vinyl polymers can be similarly pigmented; thus the pigment was also ground with dimethylformamide for addition to spinning dopes of polyacrylonitrile and various acrylonitrile interpolymers.

The following examples will serve to further illustrate the fact that the polymeric pigments of this invention can be dyed prior to spinning the fibers from the dope containing the pigment. The techniques employed in dyeing these polymeric pigments before they are incorporated into the spinning composition (either a dope employing a solvent for the fiber-forming constituent, a granulated or molten polyester, etc.) are essentially the same as those known in the art for dyeing polymeric materials. Ordinarily, the polymeric pigment is advantageously isolated from the suspending medium and then dyed following which it can be incorporated into a dope or into a melt spinning composition as illustrated in the above-mentioned application Serial No. 623,533 filed on even date with the parent application by Caldwell, Gilkey and Dannelly which was filed on November 21, 1956. However, when the polymeric pigment is formed in water, it is advantageous to add the dye to the dispersion of the polymeric pigment in the water and to then isolate the colored pigment from the aqueous medium. The dyes which can be employed for coloring the polymeric pigments include acid wool dyes (often referred to as acid dyes), cellulose acetate dyes (such as those that dye directly on acetate fibers), direct cotton dyes, basic dyes, vat dyes, metallizable dyes, etc. Numerous dyes which can be employed are set forth in the alphabetical list of American-made dyes published in the Technical Manual and Year Book of the American Association of Textile Chemists and Colorists, such as begins on page 168 of the 1952 edition of this publication.

When chelate-type dyes are employed, a metal ion such as chromium, nickel, copper or cobalt can first be incorporated into the polymeric pigment following which the metallizable dye can be applied in the usual manner. Alternatively, the latter process can be reversed by first dyeing the polymeric pigment with the metallizable dye and then applying the metallizing agent.

Specific examples of basic dyes are: Phosphine GRNA (C.I. No. 46040), Phosphine 5 GN (C.I. No. 46035), Pencil Violet 2B (C.I. No. 42535).

Specific examples of vat dyes are: Jade Green B (C.I. No. 59825), Olive Green B1 (C.I. No. 69500), Flavone GC (C.I. No. 67300).

Specific examples of metallizable dyes are: Chrome Cyanine BLL (C.I. No. 17940), Chrome Yellow ME (C.I. No. 18710), Alizarine Blue 2 RC (C.I. No. 58605).

Specific examples of premetallized dyes include: Palatine Black (C.I. No. 15711), Palatine Blue BNOA–CF (C.I. No. 15706), Palatine Red GREW (C.I. No. 1880).

Dyes which can be employed include cellulose acetate dyes, direct cotton dyes, vat dyes, acid wool dyes, basic dyes, mordant dyes, metallized acid dyes and metallized neutral dyes, which terminology is that used in said AATCC year book.

*Example 7*

The following materials were placed in a flask:

| | Grams |
|---|---|
| N-tert-butylacrylamide | 50.0 |
| N-isopropylacrylamide | 50.0 |
| Divinylbenzene | 1.0 |
| Sodium dodecyl sulfate | 3.0 |
| Potassium persulfate | 1.0 |
| Water | 900.0 |

The mixture was stirred vigorously at 60 to 70° C. for 6 hours. A stable emulsion was produced. The emulsion was spray-dried by spraying it into a heated chamber with an atomizer nozzle. The product was collected as a fine powder.

Ten grams of the powder was suspended in 100 cc. of water and the following materials were added:

| | Grams |
|---|---|
| Xylene Milling Blue BL (acid dye, C.I. 833) | 1.0 |
| Sodium sulfate | 0.5 |
| Sulfuric acid | 0.2 |

After boiling for 30 minutes, the polymeric amide had taken up practically all of the dye and had become intensely colored. It was filtered, washed, and dried to give a fine powder.

The colored pigment dispersed readily in acetone, linseed oil, toluene, and other organic liquids. It was added to an acetone dope of cellulose acetate for the production of colored yarn.

*Example 8*

The polymeric amide made in Example 7 can be dyed in the original emulsion or suspension, as described below.

One hundred grams of the emulsion, containing 10 grams of pigment, was mixed with 50 cc. of water containing 0.2 gram sodium sulfate, 0.1 gram sulfuric acid, and 1.5 gram of Xylene Milling Red G (acid dye C.I. 443). The mixture was heated and stirred for 1 hour at 95 to 100° C. The highly colored pigment separated out as a flocculant precipitate. It was centrifuged from the solution and washed several times by decantation. The wet cake was dispersed in a water-base paint as a coloring agent.

The dyed pigment may also be obtained as a dry powder by evaporating the water from the washed pigment.

The polymeric amide may be dyed with direct cotton dyes, cellulose acetate dyes, vat dyes, and basic dyes.

Example 9

The following materials were placed in a flask:

| | Grams |
|---|---|
| N-methylmethacrylamide | 60.0 |
| N-tert-butylacrylamide | 40.0 |
| Triallyl cyanurate | 4.0 |
| Sodium octadecyl sulfate | 3.0 |
| Potassium persulfate | 1.0 |
| Sodium bisulfite | 0.5 |
| Water | 1000.0 |

The mixture was stirred at 80 to 90° C. for 3 hours to give a stable emulsion having a particle size less than 1 micron. This pigment showed a strong affinity for acid wool dyes, cellulose acetate dyes, direct cotton dyes, basic dyes, and vat dyes.

Two hundred grams of the emulsion, containing approximately 20 grams of polymer, was mixed with 100 cc. of water containing 2 grams of Milling Red SWG (acid dye C.I. 430), 2 grams of sodium sulfate, and 0.3 gram of sulfuric acid. The mixture was stirred at the boil for 30 minutes. The pigment separated out as a dark red precipitate. It was centrifuged from the solution and washed by alternately stirring with water and centrifuging. It was dried to a fine powder that readily dispersed in organic liquids.

Two hundred grams of the emulsion was heated and stirred at 90 to 95° C. for 1 hour with 3 grams of Fastusol Blue LF3R (C.I. 319), a direct cotton dye. Ten grams of sodium sulfate was then added and the colored pigment was centrifuged from the solution. After washing and drying, it was a fine powder that readily dispersed in organic liquids.

Two hundred grams of the emulsion was heated and stirred at 90 to 95° C. for 1 hour with 4 grams of Eastone Yellow 5G, a cellulose acetate dye. The pigment was precipitated by adding sodium sulfate. After washing and drying, a fine powder was obtained.

Example 10

Using the methods described above, an emulsion polymer was made from 60 grams N-methylmethacrylamide, 40 grams methylmethacrylate, and 2 grams methylenebisacrylamide. The particle size was less than 0.5 micron.

Colored pigments were made by dyeing the polymer particles with acid wool dyes, direct cotton dyes, vat dyes, cellulose acetate dyes, and basic dyes.

Example 11

Twenty-five grams of N-ethylacrylamide, 5 grams of 2-methyl-5-vinylpyridine, 2 grams divinylbenzene, 3 cc. acetic acid, 0.4 gram azobisisobutyronitrile, and 65 cc. of tert-butyl alcohol were stirred and heated at 50 to 60° C. for 24 hours. The cross-linked polymeric amide separated out as a fine powder. The powder was washed with acetone and dried. It could be dyed with acid wool dyes, direct cotton dyes, and cellulose acetate dyes to give colored pigments.

Example 12

In this example, the polymeric amide was produced in two stages. An acrylonitrile copolymer was made as a fine emulsion. Cross-linked N-methylmethacrylamide was then deposited on the surface of the particles. The resulting product had a strong affinity for practically all classes of dyes.

The following materials were placed in a flask:

| | Grams |
|---|---|
| Acrylonitrile | 95.0 |
| N-isopropylacrylamide | 6.0 |
| Potassium persulfate | 1.0 |
| Sodium dodecyl sulfate | 3.0 |
| Water | 400.0 |

The mixture was stirred at 50 to 60° C. for 6 hours to give an emulsion polymer with a particle size less than 0.5 micron.

Thirty grams of N-methylmethacrylamide, 0.45 gram methylenebisacrylamide, and 0.3 gram potassium persulfate were added to the emulsion. After stirring at 50° C. for 6 hours, the N-methylmethacrylamide had polymerized as an insoluble layer on the original emulsion particles.

The product dyed heavily with acid wool dyes, cellulose acetate dyes, direct cotton dyes, and vat dyes.

Example 13

Similar results were obtained by using N,N-dimethylacrylamide in Example 12 in place of the N-methylmethacrylamide.

Two especially valuable pigments are described in Examples 14 and 15.

Example 14

The following materials were placed in a reaction vessel:

| | Grams |
|---|---|
| N,N-dimethylacrylamide | 1200 |
| Methyl methacrylate | 400 |
| Divinylbenzene | 160 |
| Fatty alcohol sulfate such as Duponol ME | 40 |
| Polyoxylethylated fatty alcohol such as Emulphor ON-870 | 28 |
| Potassium persulfate | 8 |
| Sodium bisulfite | 3 |
| Water, 4 gallons. | |

The mixture was stirred rapidly at 50 to 60° C. for 8 hours to give a fine, stable suspension of polymer. The pigment was isolated as a fine powder by spray-drying.

This pigment has a strong affinity for practically all classes of dyes. It can be mixed into spinning dopes in the production of cellulose acetate, cellulose triacetate, acrylonitrile polymer, and other types of fibers. The pigment also can be dyed in water suspension to give colored pigments.

Example 15

Using the general method described in Example 14, a pigment was made from the following materials:

| | Grams |
|---|---|
| N,N-dimethylacrylamide | 1100 |
| Ethyl acrylate | 500 |
| Divinylbenzene | 160 |
| Fatty alcohol sulfate such as Duponol ME | 40 |
| Polyoxylethylated fatty alcohol such as Emulphor ON-870 | 28 |
| Potassium persulfate | 8 |
| Sodium bisulfite | 3 |
| Water, 4 gallons. | |

The product had excellent affinity for practically all classes of dyes.

Example 15A

As elsewhere explained herein, the pigments of this invention are useful in coatings and in fibers for fabrics which transmit water vapor but not liquid water. These coatings or fibers are obtained by mixing the amide pigment with elastomers such as rubber, plasticized polyvinyl butyral, plasticized polyvinyl chloride, etc. In a typical case, the pigment of Example 15 was isolated as a powder. Films of neoprene rubber, plasticized polyvinyl butyral and plasticized polyvinyl chloride were made, each containing 30 percent by weight of the amide pigment. The films were tested by a standard method for water vapor transmission using 100 percent relative humidity on one side and 40 to 50 percent on the other side. They showed a transmission rate of 0.033 to 0.038 grams/hour/10 sq. cm. This is a useful rate for apparel such as raincoats, etc. The modified elastomers have a transmission rate less than 0.010 grams/hour/10 sq. cm.

In an accelerated aging test, the polyvinyl chloride film was heated at 100° for 8 hours. There was no change in color or physical properties, showing that the pigment did not attack the halogen in the polymer.

Example 16

The following materials were placed in a reactor:

|  | Kg. |
|---|---|
| N,N-dimethylacrylamide | 7.0 |
| Methyl methacrylate | 2.0 |
| Divinylbenzene | 1.0 |
| Fatty alcohol sulfate such as Duponal ME | 0.1 |
| Polyoxyethylated fatty alcohol such as Emulphor ON–870 | 0.2 |
| Potassium peroxide | 0.1 |
| Sodium metabisulfite | 0.05 |
| Water | 100.0 |

This mixture was stirred and the temperature was raised to 50° C. Polymerization was initiated, and the temperature rose to 63° C. After 4 hours, the reaction was considered complete and analysis showed that 97 percent of the monomers of the mixture had been converted into polymer having the form of small permanently suspended particles. The particle sizes were measured by means of an electron microscope and were found to range from 25 to 75 millimicrons in diameter.

A portion of this suspension was converted into a dry powder by a spray drying technique. A laboratory size spray dryer was used. The spray dryer was used with an atomizer type head which had a 0.05-inch orifice. The suspension was sprayed through the nozzle using air at 80 pounds per square inch pressure. The suspension was allowed to flow into the dryer at the rate of 20 pounds per hour. The air used to dry the suspension was heated to 190° C. which caused to heated chamber to operate at 125° C.

The dry polymeric pigment was obtained as a finely divided powder which was composed of aggregates of the original particles. These aggregates were measured and were found to range from 0.1 to 2 microns in diameter.

It was found that most polar organic liquids such as ketones, alcohols, esters and mixtures of nonpolar liquids, and the polar liquids would cause the aggregates to be reduced to the original particles. The small particles of 25 to 75 millimicrons were regenerated by simple contact of these aggregates with the polar organic liquid.

A second portion of the suspension, which was obtained by the above reaction, was converted to a dry powder by drying the suspension in thin layers in open trays or with a drum dryer. The temperature of the drum dryer was maintained at 130° C. The use of both techniques produced the dry polymer in the form of extremely friable granules and flakes which were approximately one millimeter across.

These granules and flakes were reduced to very small particles by four methods.

(1) The dry polymer was ball-milled for 2 to 3 hours using a ball mill having ½-inch balls. The particles of polymer were 0.5 to 2.5 microns in diameter.

(2) Another portion of dried polymer was pulverized in a ball mill as above but which contained an inert organic liquid such as hexane. Two to three hours of grinding produced particles of polymeric pigment. These particles were 0.1 to 1 micron in diameter.

(3) Another portion of the dry granules was treated with acetone. The granules disintegrated into the original particles having a diameter of 25 to 75 millimicrons with no mechanical shear.

(4) Another portion of the granules was reduced to small particles using a 3-roll mill of standard design. The granules were reduced to particles measuring 0.5 to 2 microns in 2 hours when dioctyl phthalate was used as the suspending liquid.

In all cases when the original suspension was dried, there was some aggregation of the particles of polymeric pigment. However, regardless of how the dry powder was obtained, it was found to differ from most powdered polymers in that these aggregates were readily crushed or ground and that the original particles could be regenerated by the action of most organic liquids.

Another portion of the granular material, which was obtained from drum drying the original suspension, was milled with various elastomers. A standard 2-roll rubber mill was used. The rolls were cooled to 25° C. for all elastomers. The original particle size of the pigment was obtained when the granules were milled with polychloroprene, polyvinyl butyral, and GRS rubber. These elastomers were milled with polymeric pigment so that the final material consisted of 20 to 40 percent polymeric pigment. The pigment was present as a dispersion within the elastomer where the individual particles of the dispersion were 25 to 75 millimicrons in diameter.

Example 17

A polymeric pigment with the following composition was prepared using the method described in Example 16.

|  | Percent |
|---|---|
| N,N-dimethylacrylamide | 70 |
| Ethyl acrylate | 20 |
| Triallyl cyanurate | 10 |

This polymeric pigment was obtained as permanently suspended particles which were 25 to 75 millimicrons in diameter. This suspension was converted to dry powders by the same methods described in Example 16. The same equipment and the same conditions of temperature and feed rate were used.

However, the dry material was even more easily ground or crushed than the material described in Example 16. There was less tendency to form aggregates and all grinding operations could be performed in less time. For instance, this material was reduced to particles measuring 0.08 to 1.0 micron in diameter using a ball mill with ½-inch diameter balls in ½ hour.

The three roll mills described in Example 16 produced particles of 0.09 to 1.5 microns in 2 hours when dioctyl phthalate was the suspending liquid.

Example 17A

Using the procedure of Example 17 as described above, a pigment was prepared having the composition 70 percent N,N-dimethylacrylamide +20 percent methyl methacrylate +10 percent divinylbenzene. This pigment contains almost 11 percent amide nitrogen. Fibers of cellulose triacetate were spun containing 15 percent by weight of the pigment. They had a moisture regain of 5.62 percent whereas ordinary cellulose triacetate yarn has a moisture regain of 3.5 to 4.0 percent. The fibers dyed well with acid wool dyes and disperse type dyes and the dyes showed no fading after 20 hours' exposure in a standard Fade-Ometer. Unmodified cellulose triacetate fibers are only tinted by these classes of dyes. The cellulose triacetate fibers had the following properties: 1.3 grams per denier dry strength, 0.90 gram per denier wet strength and 27 percent dry elongation.

For comparison a pigment was made having the composition 30 percent N,N-dimethylacrylamide, 60 percent methyl acrylate and 10 percent divinylbenzene. This pigment contains 5.3 percent amide nitrogen. In order to obtain cellulose triacetate fibers having a moisture regain of 5.6 percent, it was necessary to add 25 to 30 percent of the pigment to the fiber. Cellulose triacetate fibers containing this amount of pigment had a dry tensile strength of 1.1 grams per denier, wet tensile strength of 0.75 gram per denier and dry elongation of 20 percent. It is thus apparent that the pigment containing the higher amount of amide nitrogen possesses a substantial advantage.

Example 17B

As above a pigment was made having the composition 70 percent N,N-dimethylacrylamide +20 percent methyl acrylate +10 percent divinylbenzene. A fiber-forming copolymer was prepared having the composition 51.5 percent acrylonitrile +48.5 percent vinylidene chloride. A mixture of 85 parts of this copolymer and 15 parts pigment was spun into fibers from acetone dope. The fibers had a moisture regain of 5.2 percent as compared with 1 percent for the unmodified fibers. They dyed well with cellulose acetate, acid wool, and direct cotton dyes and the dyes showed no fading after 20 hours' exposure in a standard Fade-Ometer. Moreover, fibers containing the pigment showed no change in color when heated at 100° C. for 8 hours. This stability test showed that the pigment did not react with the halogen in the copolymer.

Example 18

The following materials were placed in a reactor which was equipped with an agitator capable of very high shear in a mobile liquid.

| | Kg. |
|---|---|
| N,N-dimethylacrylamide | 7.0 |
| Ethyl acrylate | 2.0 |
| N,N'-methylene bisacrylamide | 1.0 |
| Poly-N-isopropylacrylamide | 0.2 |
| Benzoyl peroxide | 0.1 |
| Acetone | 100.0 |

This mixture was stirred and the temperature was maintained at 50° C. After 8 hours, a slight haze had appeared, but there was only a very slight change in viscosity of the acetone. However, analysis showed that 93 percent of the monomers listed above had polymerized. The polymer was obtained as very fine particles which were permanently suspended. Electron microscope measurements showed these particles to be 30 to 60 millimicrons in diameter.

This polymeric pigment was obtained as a dry powder using 2 methods:

(1) A portion of the final suspension was spray dried using a laboratory size spray dryer equipped with an atomizer. The nozzle had an orifice of 0.025 inch in diameter and air at 80 p.s.i. was used to operate the nozzle. The drying chamber of the spray dryer was maintained at 130° C. and the feed rate of the suspension was 8.0 gallons per hour.

The dry powder which was obtained from the dryer was in the form of aggregates of the original particles. These aggregates measured 1 to 3 microns in diameter.

The original fine particles of 30 to 60 millimicrons could be regenerated by the action of polar organic liquids.

(2) Another portion of the final suspension was converted to a dry powder by drying the suspension on a drum dryer and grinding resulting granules. The drum of the drum dryer was heated to 110° C. The dry polymer was obtained in the form of a powder made up of particles which were measured and found to be 1 to 10 microns in diameter.

These particles were very easily crushed by the grinding equipment described in Example 16. Samples which were ball-milled had particles which measured 0.05 to 0.09 microns in diameter. These particle sizes were obtainable in 1 to 2 hours.

The following examples will serve for comparative purposes to further illustrate the advantages achieved by the present invention.

Example 19

For the purposes of comparison, a soluble (uncrosslinked) polymer was prepared using the same equipment described in Example 16. The following materials were placed in the reactor:

| | Kg. |
|---|---|
| N,N-dimethylacrylamide | 7.0 |
| Methylmethacrylate | 2.0 |
| Styrene | 1.0 |
| Polyoxethylated fatty alcohol such as Emulphor ON-870 | 0.2 |
| Fatty alcohol sulfate such as Duponol ME | 0.1 |
| Potassium sulfate | 0.1 |
| Sodium meta bisulfite | 0.05 |
| Water | 100.0 |

This mixture was stirred and the temperature was raised to 50° C. Polymerization was initiated, and the temperature rose to 63° C. After 4 hours the monomers were 97 percent converted to polymer. The polymer was obtained as a solution in the water. The solution had a moderate solution viscosity.

This solution could not be spray dried to give a powder. All efforts to use the spray dryer described in Example 16 gave fibrous material. This fibrous material had a tendency to adhere to the walls of the spray dryer.

The final solution was evaporated to the dry polymer using the drum dryer described in Example 16. The solution was dried with some difficulty since the drum of the dryer could not be heated above 100° C. without causing the polymer to adhere to the drum.

The dried material was not easily ground by either a ball mill or the three-roll mill described in Example 16. The smallest particle was produced using the ball mill equipped with ½-inch balls and by grinding 3 days with the polymer suspended in hexane. These particles measured 8 to 20 microns in diameter.

The polymer as it was obtained from the drum dryer could not be milled into elastomers such as polychloroprene, polyvinyl butyral, and GRS rubber to give a fine dispersion of the polymer in the elastomer. The polymer had a tendency to melt and form large aggregates due to the incompatibility of the amide group containing polymer and the elastomer.

Example 20

For the further purpose of comparison, a polymeric pigment was prepared from acrylonitrile and methylene bisacrylamide in a ratio by weight of 106 parts to 3.08 parts using an aqueous emulsion polymerization process employing an emulsifying agent, a persulfate catalyst and bisulfite activator. After stirring several hours the suspended particles were coagulated and collected, washed and separated as a polymeric pigment. The polymer contains about 25.5 percent nitrogen, most of which is nitrile nitrogen. Fibers of cellulose triacetate containing 15 percent of the polymeric pigment were spun as described in Example 17A above. The fibers had a moisture regain of 4.0 percent as compared with 4.0 percent for unmodified cellulose triacetate. Since the acrylonitrile polymer contains practically no hydrophilic groups, it cannot impart any moisture-absorbing properties to the fiber. The fiber only tinted with acid wool dyes. This polymeric pigment contains amide nitrogen in the methylenebis(acrylamide) moiety but it is below the minimum of 8 percent required to obtain a practical degree of moisture absorption and affinity for acid wool dyes.

Example 21

For further purposes of comparison a polymeric pigment was similarly made as described in Example 20 using equal parts by weight of methacrylonitrile and vinyl pyridine cross-linked with 8 parts of ethylenebismethacrylate based on a total of 128 parts of said monoolefinic monomers. This polymeric pigment contains basic amino groups.

Example 22

For further purposes of comparison, a polymeric pigment was similarly made using dimethylaminoethyl methacrylate crosslinked with ethylenebismethacrylate in a weight ratio of 32 parts to 3 parts, respectively. This polymeric pigment contains basic amino groups as in the case of above Example 21.

The polymeric pigments of Examples 21 and 22 were employed to spin cellulose triacetate fibers containing 1 to 5 percent of each pigment. These fibers dyed well with acid wool dyes but the color was substantially all faded after 20 hours' exposure in a standard Fade-Ometer. The fibers also had some affinity for cellulose acetate dyes but the dyes did not have their true shade on the fiber and were badly faded after 20 hours' exposure in the Fade-Ometer.

The polymeric pigments of Examples 21 and 22 were incorporated in the spinning dope of a copolymer made from 51.5 percent acrylonitrile and 48.5 percent vinylidene chloride. Fibers containing 15 percent of each polymeric pigment were heated at 100° C. for 8 hours. The fibers turned dark brown. This color change was caused by the reaction of the amino group in the pigment with the chlorine in the copolymer. As shown in Example 17B above, the pigments containing amide groups do not attack chlorine-containing polymers.

The product of Example 20 was incorporated in elastomeric films, as described in above paragraph so that the films contained 30 percent by weight of the polymeric pigment. Vapor transmission tests were run in the same way. The values obtained were less than 0.010 gram/hour/10 sq. cm. which is the same as for the unmodified elastomer. Although the pigment of Example 20 contains a high percent of nitrogen, the particles do not have the power to transmit water vapor.

The pigments of Examples 21 and 22 were incorporated in elastomeric films as described above. The films had a water vapor transmission rate of 0.020 to .030 gram/hour/10 sq. cm. However, when the films were heated at 100° C. for 8 hours, the Neoprene and the polyvinyl chloride became discolored, showing that the amine groups in the microgel attacked the halogen in the polymers.

The pigments described in Examples 17A and 17B according to this invention have more than 8 percent nitrogen as amide nitrogen. It has been found that amide nitrogen has three valuable properties: (a) it has a strong affinity for dyes; (b) it absorbs moisture and hence it is neutral and will not cause dye fading nor will it attack halogenated polymers. Nitrogen in other forms such as nitrile or amino groups, does not possess this valuable combination of properties. The products disclosed in Examples 20, 21, and 22, above, even though they contain nitrogen, are deficient in one or more of the three properties mentioned above.

In Example 20 above, the polymeric pigment contains 25.5 percent nitrogen but it does not impart any improved moisture absorption properties to the fiber. Hence it is deficient with respect to property (b).

In Examples 21 and 22 polymeric pigments containing amine groups are used. It has been demonstrated that these products caused dye fading. Furthermore, they caused decomposition of halogenated polymers. Thus this type of polymeric pigment is deficient in property (c).

The ability of the amide pigments of this invention to transmit water vapor is also described above. This is a very important property because the compositions give rise to a whole new class of textile products. It is important to note that the amide pigments can be used in halogenated polymers such as Neoprene rubber and polyvinyl chloride without degradation.

In contrast, the pigments having amino radicals have been shown to either fail to transmit water vapor or decompose the halogenated polymers.

Examination of other products disclosed in various publications shows that, in general, they are deficient in one or more of the important properties outlined above. Furthermore, none of these publications teach that products containing more than about 8 percent amide nitrogen have such a valuable combination of properties and are unique in this respect.

It is thus apparent that the amide pigments having a nitrogen content of 8 percent or higher possess a unique and unpredictable combination of valuable properties. As such, they represent a valuable contribution to the art.

The polymeric pigments of the present invention are also quite distinguishable from linear polyamide particles which are dense, crystalline and much less absorptive of dyes and of inferior utility as regards water vapor transmission through thin organic plastic layers; moreover, linear polyamides swell in most organic liquids and tend to aggregate and clump together. The pigments of the present invention are nongelatinous. They absorb 50 to 100 percent more dye than linear polyamide pigments on a weight basis.

The polymeric pigments of this invention should not be confused with ordinary graft or backbone polymers or block-type polymers in view of their physical properties and their attributes when incorporated into synthetic organic plastics which include these distinctly different graft, backbone or block-type polymers.

As already described above, an especially advantageous process representing an embodiment of this invention is a process for preparing a pigment adapted for incorporation in synthetic organic plastics comprising (I) forming a mixture comprising (A) an ordinary solvent selected from the group consisting of water, liquid hydrocarbons containing up to 10 carbon atoms, alcohols having from 1 to 12 carbon atoms, ketones having from 3 to 9 carbon atoms, alkyl formamides having from 2 to 6 carbon atoms and alkyl esters of carboxylic acids having from 3 to 30 carbon atoms and (B) a cross-linked high polymer of (1) at least 30 percent by weight of a monoethylenically unsaturated aliphatic amide selected from the group consisting of maleic amides, fumaric amides, itaconic amides, citraconic amides, and acrylamides wherein the nitrogen atoms of all of these amides and the α-position of the acrylamides are joined to two members selected from the group consisting of (a) lower alkyl and hydroxyalkyl radicals containing from 1 to 6 carbon atoms and (b) a hydrogen atom, and (2) at least about 0.1 percent by weight of an organic cross-linking compound containing at least two nonconjugated ethylenically unsaturated bonds in at least a sufficient amount to form a cross-linked high polymer, said mixture containing from 5 to 80 percent of its total weight of said cross-linked high polymer of (1) and (2), (II) spraying droplets of said mixture into a chamber containing a circulating heated gaseous medium at a temperature of from about 40° C. to 300° C. whereby the solvent present in said droplets evaporates leaving cross-linked insolubilized high polymer in the form of nongelatinous particles and aggregates thereof having average sizes of from 25 millimicrons to 10 microns in diameter, (III) separating said particles and aggregates from said gaseous medium and (IV) suspending said particles and aggregates in at least one of said ordinary solvents whereby the aggregates are substantially completely reduced to individual discrete particles having average sizes of from 5 millimicrons to 1 micron in diameter.

The particles of polymeric pigment according to this invention may have sizes as little as 5 millimicrons which in some cases may be in the same realm of size with polymer molecules; however, polymer molecules in the normally accepted senses are not separated from each other as discrete, nongelatinous, insolubilized, relatively dense individual entities. An especially distinctive embodiment of this invention relates to the two-part pigments which have a center core and a coating as described above.

Although the invention has been described in considerable detail with reference to certain preferred embodiments thereof, it will be understood that variations and modifications can be effected without departing from the spirit and scope of the invention as described hereinabove and as defined in the appended claim.

We claim:

A pigment adapted for incorporation in synthetic organic plastics essentially composed of discrete particles comprising a core of acrylonitrile polymer having diameters substantially less than 10 microns containing thereon a pigment surface coating, said surface coating consisting essentially of a cross-linked high polymer of (1) from about 30 to about 99.9% by weight of a monoethylenically unsaturated aliphatic amide selected from the group consisting of maleic amides, fumaric amides, itaconic amides, citroconic amides, and acrylamides wherein the nitrogen atoms of all these amides and the α-position of the acrylamides are joined by chemical bonds to two members selected from the group consisting of (a) lower alkyl and hydroxyalkyl radicals containing from 1 to 6 carbon atoms and (b) a hydrogen atom, (2) from about 0.1% to about 15% by weight of an organic cross-linking compound containing at least two non-conjugated ethylenically unsaturated bonds in at least a sufficient amount to form a cross-linked high polymer and (3) from none to about 70% by weight of a monoethylenically unsaturated organic compound copolymerizable with said monoethylenically unsaturated aliphatic amide, the sum of said percentages of components (1), (2) and (3) being 100% with the amount of amide nitrogen therein being at least 8% by weight, said cross linked high polymer being insoluble in an organic solvent for said synthetic organic plastics.

References Cited by the Examiner
UNITED STATES PATENTS

| | | | |
|---|---|---|---|
| 2,800,463 | 7/1957 | Morrison | 260—34.2 |
| 2,821,521 | 1/1958 | Price | 260—78 |
| 2,839,479 | 6/1958 | Caldwell | 260—17 |
| 2,908,659 | 10/1959 | Shashoua | 260—17 |

WILLIAM H. SHORT, *Primary Examiner.*

JAMES A. SEIDLECK, *Examiner.*

J. NORRIS, *Assistant Examiner.*